United States Patent
Riedel et al.

(10) Patent No.: US 8,017,905 B2
(45) Date of Patent: Sep. 13, 2011

(54) METHOD FOR ENERGY CALIBRATION OF A PULSED LASER SYSTEM

(75) Inventors: Peter Riedel, Nuremberg (DE); Christof Donitzky, Eckental (DE)

(73) Assignee: Wavelight AG, Erlangen (DE)

( * ) Notice: Subject to any disclaimer, the term of this patent is extended or adjusted under 35 U.S.C. 154(b) by 414 days.

(21) Appl. No.: 12/201,708

(22) Filed: Aug. 29, 2008

(65) Prior Publication Data

US 2010/0051793 A1    Mar. 4, 2010

(51) Int. Cl.
G01D 18/00 (2006.01)
G06K 9/00 (2006.01)
G01B 11/02 (2006.01)
A61B 18/18 (2006.01)

(52) U.S. Cl. ............ 250/252.1; 382/128; 356/497; 606/10

(58) Field of Classification Search .......... 250/252.1, 250/459.1; 356/497; 382/128; 606/10
See application file for complete search history.

(56) References Cited

U.S. PATENT DOCUMENTS

| 5,520,679 | A | 5/1996 | Lin | |
|---|---|---|---|---|
| 6,144,456 | A | 11/2000 | Chavanne et al. | |
| 6,369,898 | B1 * | 4/2002 | Van Saarloos et al. | 356/497 |
| 6,666,855 | B2 * | 12/2003 | Somani et al. | 606/5 |
| 6,755,819 | B1 | 6/2004 | Waelti | |
| 6,806,963 | B1 | 10/2004 | Walti et al. | |
| 7,811,280 | B2 * | 10/2010 | Zickler | 606/10 |
| 2003/0016353 | A1 | 1/2003 | Detalle et al. | |
| 2004/0147910 | A1 | 7/2004 | Fujieda | |
| 2006/0100613 | A1 | 5/2006 | McArdle et al. | |
| 2011/0002514 | A1 * | 1/2011 | Youssefi et al. | 382/128 |

FOREIGN PATENT DOCUMENTS

| EP | 1494575 B1 | 9/2007 |
|---|---|---|
| GB | 2355310 A | 4/2001 |

OTHER PUBLICATIONS

Wong, Brian J. F., et al., "Surface Characterization of Laser Ablated Hard Tissue: A Comparison of Scanning White Light Interferometry and Election Microscopy," Proceedings of the SPIE, SPIE vol. 2390, Jan. 1, 1995, pp. 68-75.

International Searching Authority/European Patent Office, "Notification of Transmittal of the International Search Report and The Written Opinion of the International Searching Authority, or the Declaration," for PCT/EP2002/007102, mailed May 15, 2009, 15 pages.

* cited by examiner

Primary Examiner — David Porta
Assistant Examiner — Faye Boosalis
(74) Attorney, Agent, or Firm — Haynes and Boone, LLP

(57) ABSTRACT

In a method of calibrating the pulse energy of a laser device which provides pulsed working laser radiation, by means of the working laser radiation, multiple test ablations, in particular multiple-pulse test ablations, are carried out on one or more test objects, each with different pulse energy. The ablation depth of each of the test ablations is measured, and then, on the basis of the measured ablation depths and a specified setpoint ablation depth, an associated setpoint pulse energy is determined and set on the laser device. According to the invention, the ablation depths are measured by means of a coherent optical interferometric measuring device.

Figure 1:
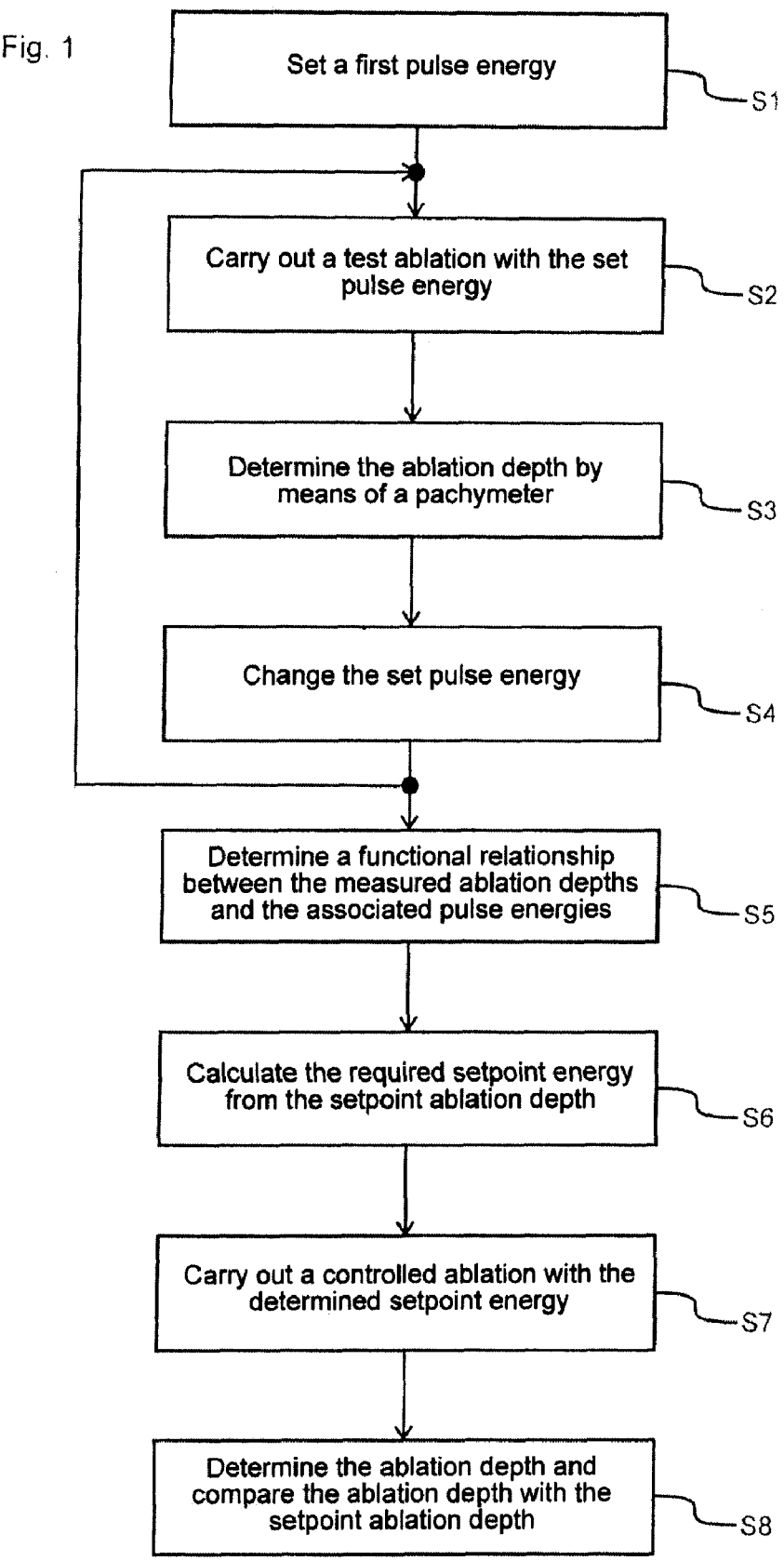

The invention also concerns a laser device, in particular to carry out the above method.

15 Claims, 4 Drawing Sheets

METHOD FOR ENERGY CALIBRATION OF A PULSED LASER SYSTEM

The invention concerns a method of calibrating the pulse energy of a laser device which provides pulsed working laser radiation. In the method, by means of the working laser radiation, multiple test ablations, in particular multiple-pulse test ablations, are carried out on one or more test objects, each with different pulse energy. The ablation depth of each of the test ablations is measured, and on the basis of the measured ablation depths and a specified setpoint ablation depth, an associated setpoint pulse energy is determined. This setpoint pulse energy is set on the laser device.

This invention also concerns a laser device to carry out an energy calibration of a working laser.

The method described above and the laser device mentioned above are used in, among other things, refractive ophthalmological laser surgery.

Refractive laser surgery should be understood here as changing the imaging properties of the optical system called the "eye" by means of laser radiation. The interaction of the irradiated laser radiation with the eye changes the refraction properties of one or more components of the eye. Since the cornea is what decides the imaging properties of the eye, in many cases laser surgery on the eye includes working on the cornea. By targeted removal of material (material ablation), a change of the shape of the cornea is caused. The term reshaping the cornea is therefore also used.

An important example of refractive ophthalmological surgery is LASIK (LASer-In-Situ-Keratomileusis), in which the cornea tissue is removed (ablated) to reshape the cornea to correct visual defects. For ablating cornea tissue, an excimer laser in the UV range (typically 193 nm) is usually used. The laser radiation is guided over the eye temporally and positionally in such a way that at selected locations of the cornea a specified quantity of tissue is ablated. This ablation is described by the so-called ablation profile, i.e. the ablation profile indicates the ablation to be done at every point of the cornea.

The ablation profile is usually calculated before the surgical intervention for the eye to be corrected is carried out. The basis of this calculation is measurement of the eye in its current state. For this measurement of the eye, the prior art knows various techniques, in particular topography meters (so-called topolyzers), wave front analysers, Scheimpflug devices, pachymeters and subjective refraction determination.

The ablation profile is calculated so that after the operation, the cornea has an optimum shape for the treated eye, and previously existing optical imaging errors of the eye are corrected as far as possible. For calculating the ablation profile, suitable methods have been available to specialists for quite a long time.

When the ablation profile for the eye to be treated has been determined, next how the desired removal can best be achieved with the available laser radiation is computed. To do this, a relationship between the energy density of the laser pulse and the material removal which it effects must be found and taken into account. This relationship forms the basis for calibrating the working laser for a material to be worked on and a defined removal of material. In addition to the energy density of the laser pulse, a series of further parameters influence the amount of the material removal, e.g. the material properties themselves, the material temperature, the surface shape, etc., but here primarily a variation of the pulse energy will be considered. The control programme for the laser pulses is computed on the assumption of a specified, constant removal per pulse. It is therefore important that the energy which effects precisely this assumed/required removal should be precisely set on the laser system.

In ophthalmological surgery, various kinds of methods for energy calibration of lasers with respect to the effect of the pulsed laser light with the material to be worked on are known:

In a first method, by means of the laser beam to be calibrated, an ablation is carried out on a special capacitor foil. The ablation causes a colour change, which is then used as a measure of the energy which has been applied to the foil to ablate it.

In a further method of energy calibration, a refractive ablation is applied to a sample of polymethylmethacrylate (PMMA). Then the change of the refraction at the ablation position is determined using a vertex refractometer.

Also, a method in which a defined test ablation is carried out on a PMMA fluence test disc has been developed. "Fluence" here is understood as the energy of the laser beam per unit area. The ablation depth of the test ablation is measured by means of a mechanical probe. If the determined ablation depth is within a specified range, the energy of the laser system is set correctly.

However, the above-mentioned methods and the associated systems have various disadvantages. For instance, if the mechanical measurement of a fluence test disc of PMMA as described above is used, the user must decide after every ablation and measurement whether the set energy must be adjusted or has already been set correctly. To achieve the desired setpoint value for the energy of the laser beam, it can happen that the user must repeat this procedure several times. This is rather complicated for the user, who must approach the optimum ablation depth and thus the desired radiated energy step by step, by raising or reducing the radiated energy.

It is an object of this invention to give an improved energy calibration method and a corresponding laser device which avoid the above-mentioned disadvantages.

According to the invention, for this purpose, in the above-mentioned method, it is provided that the ablation depths are measured by means of a coherent optical interferometric measuring device. This makes contactless measurement of the ablation positions on the test object(s) possible, so that one precondition of automation of the calibration method is fulfilled. In this way, both the depth of the ablation and the distance of the test object from the laser device can be determined. Additionally, in a coherent optical interferometric measuring method it is possible to carry out the measurement in a beam-guided manner and at some distance from the test object, and thus to integrate the measuring method into an existing laser device which provides pulsed working laser radiation.

Contactless determination of the ablation depth and the integration capability of the measuring method permit a completely new approach to the determination of the ablation depth on the test object. Thus, for one thing, the calibration of the pulse energy can be improved so that, for instance, the test object is measured directly after the test ablation, without the test object having to be moved for the purpose, and thus automation of the calibration process can be achieved. Also, the precision of the calibration is improved, since by means of the coherent optical interferometric measuring device, simultaneously with the ablation depth, the position of the test object relative to the working plane of the laser device can be determined and adjusted. This permits a more precise, because better adapted to the later use situation, determination of the pulse energy of the working laser.

According to an advantageous embodiment of the method, the measuring device works on the OLCR (Optical Low Coherence Reflectometry) principle. This measurement principle is used in pachymetry, to measure the thickness of the cornea. The invention thus teaches using a method which is suitable for measuring the thickness of the cornea to measure the ablation depth of a test ablation on the test object. Thus a change of the refractive properties of the test object, caused by the ablation, can be precisely and reproducibly determined.

In particular, it is specially easy to integrate the interferometric measuring device if the ablation depths are measured by means of a measuring beam of the measuring device, the course of said measuring beam being coaxial with the working laser radiation. Optical devices which already exist, e.g. mirrors, lenses, etc., and which are used to guide and shape the working laser beam, can be used simultaneously for the measuring beam of the measuring device. To automate the energy calibration process, several of the test ablations can be carried out on the same test object, which can be moved relative to the measuring device between successive test ablations. In particular, it can be provided that the test object is not moved manually but by a motor, so that without the intervention of a user, a series of test ablations can be carried out on the test object.

In an embodiment, it is provided that the test ablations are applied at a radial distance from the disc centre of a test disc which is used as the test object, and a turntable which carries the test disc is turned by a specified angle of rotation between successive test ablations. The test ablations are thus distributed evenly, at a maximum distance from each other, on the test disc, and movement of the test object is achieved in a technically simple manner. Falsification of the measurement result by deposit of the material from adjacent ablations is reduced or avoided.

In a method according to the invention, it can also be provided that on a test object, in particular a test object with at least one test ablation, a control ablation with the determined setpoint pulse energy is carried out, and the ablation depth of the control ablation is then measured with the measuring device. This is useful, in particular, after a series of test ablations on the test object. For instance, after determining the ablation depths of the several test ablations, assuming a functional relationship between the applied pulse energy and ablation depth, a setpoint pulse energy which correlates with the setpoint ablation depth can be derived. By carrying out a control ablation with the determined setpoint pulse energy, it is possible to verify whether this setpoint pulse energy results in the desired setpoint ablation depth.

For cooling the test object(s) and/or for cleaning the region above the test ablations, it is recommended that an air current should be generated and directed at least onto the ablated part of a test object. This can happen while a test ablation is being carried out, or at least after it, to blow away any ablation products in the unavoidable ablation clouds for precise, optical measurement of the ablation craters.

As well as the described method according to the invention for pulse energy calibration, the idea of the invention is also implemented in a laser device. Such a laser device comprises:
- a laser radiation source, which provides pulsed working laser radiation for processing an object,
- a coherent optical interferometric measuring device for measuring at least one length measurement using a measuring beam which runs along the direction of the working laser radiation,
- a controllable positioning module for positioning a test object arrangement which is formed from at least one test object in multiple defined positions relative to the laser radiation source,
- a computer which controls the laser radiation source, the measuring device and the positioning module, and which is designed to carry out the following actions to calibrate the laser radiation source, under the control of a control program:
  carry out multiple test ablations, in particular multiple-pulse test ablations, on the test object arrangement by means of the working laser radiation, with different pulse energy in each case,
  control the positioning module, to move the test object arrangement between successive test ablations in various of the defined relative positions to the laser radiation source,
  measure the ablation depth of each of the test ablations by means of the measuring device,
  determine a setpoint pulse energy on the basis of the measured ablation depths and a specified setpoint ablation depth, and if appropriate set the determined setpoint pulse energy for the working laser radiation.

The invention is explained further below, on the basis of the attached drawings.

Figure 5:
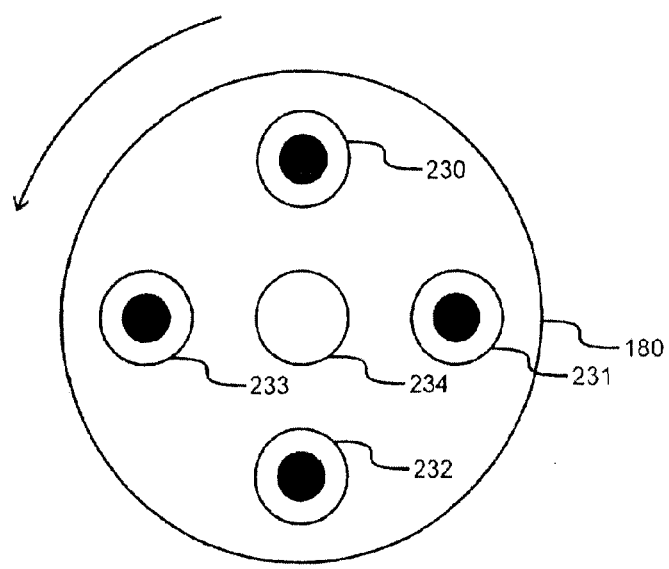
Figure 2:
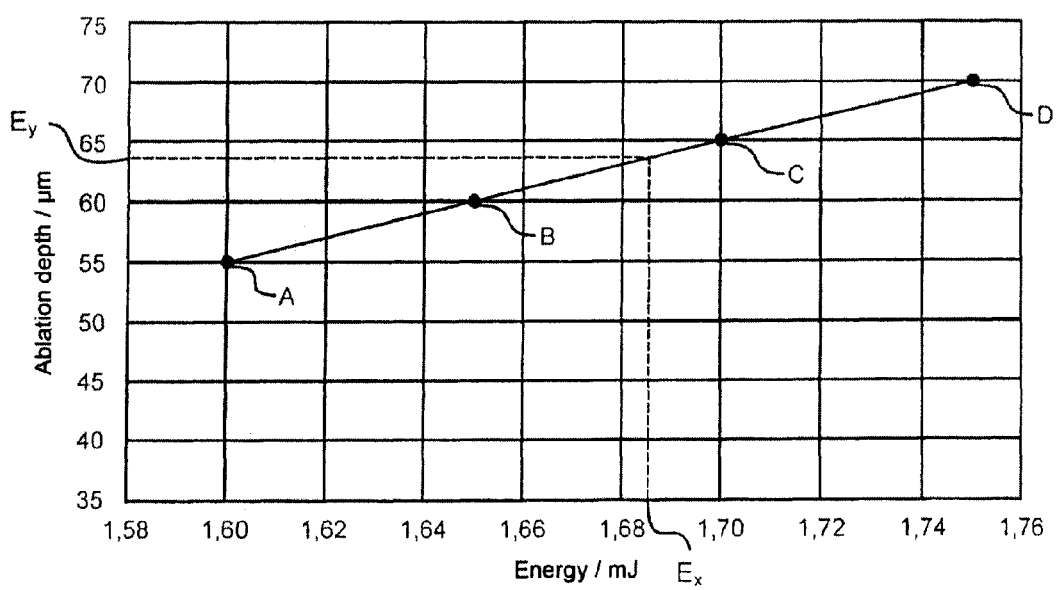
Figure 3A:
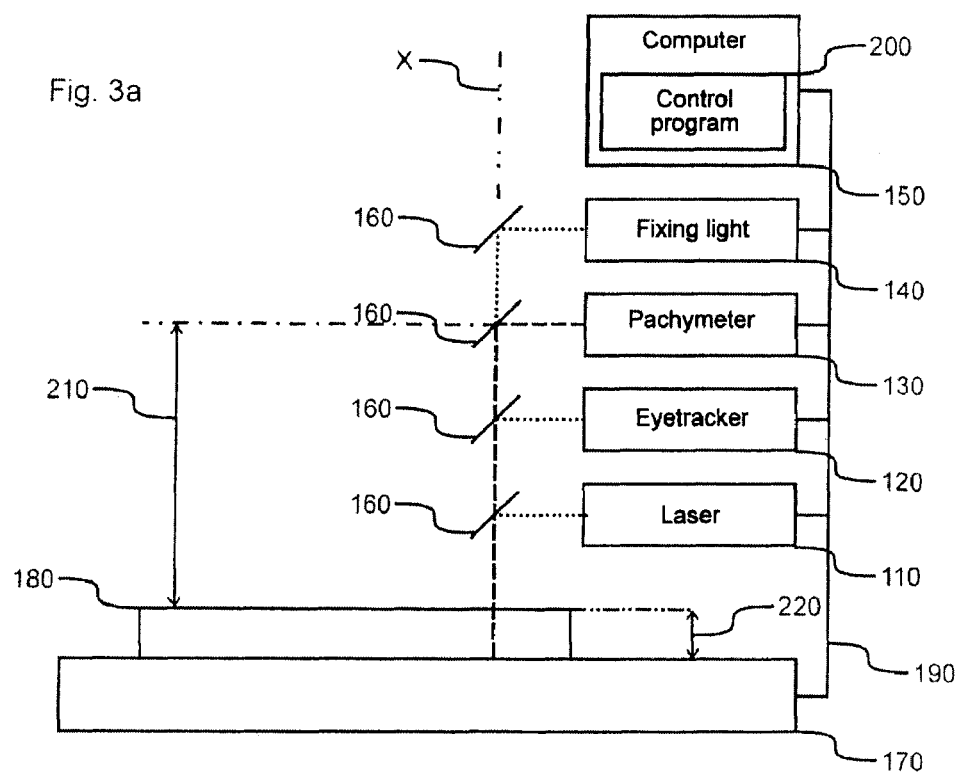
Figure 3B:
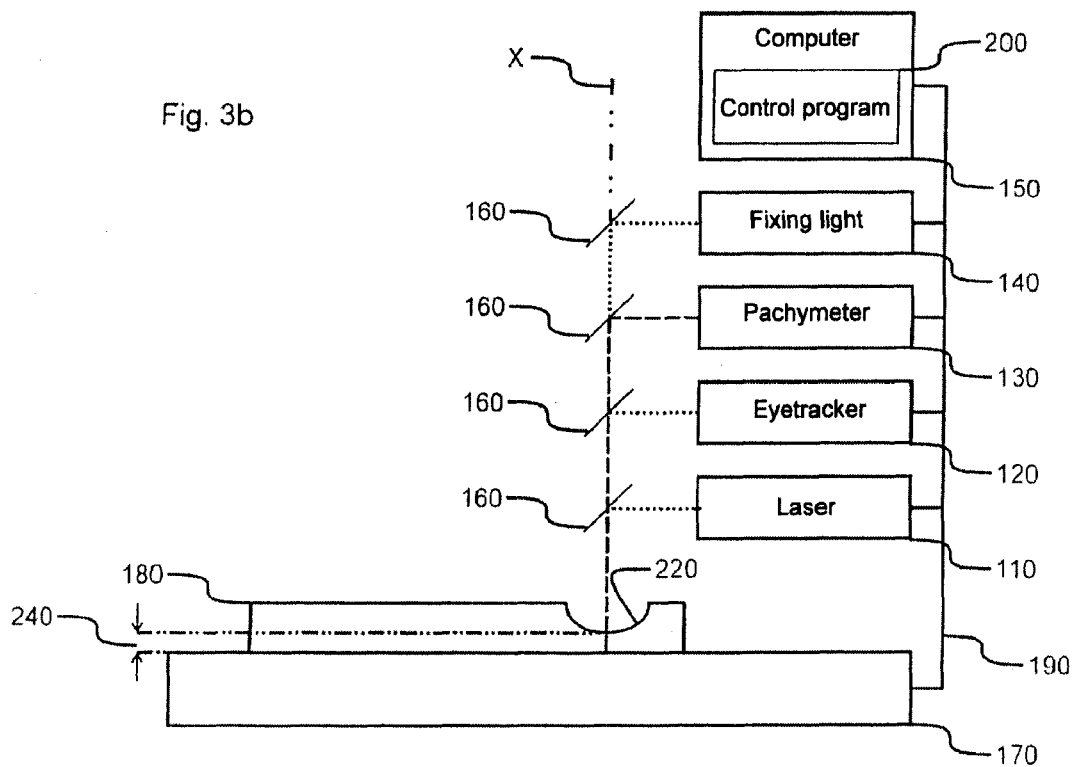
Figure 4A:
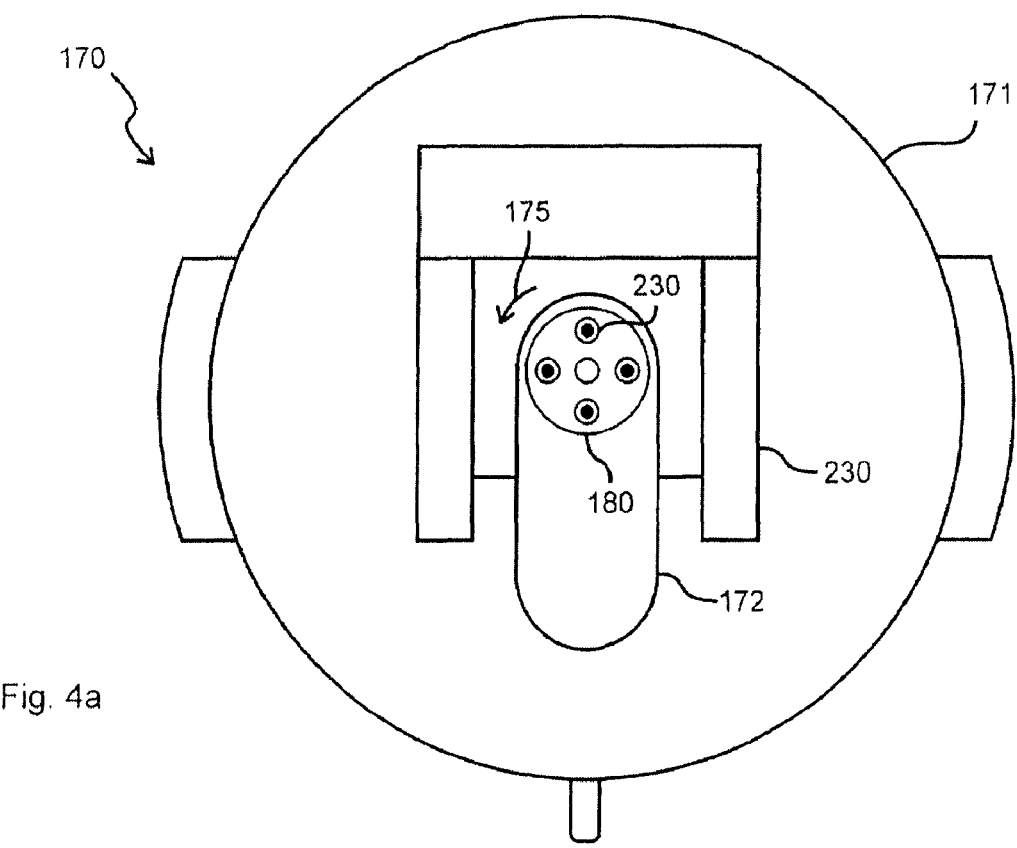
Figure 4B:
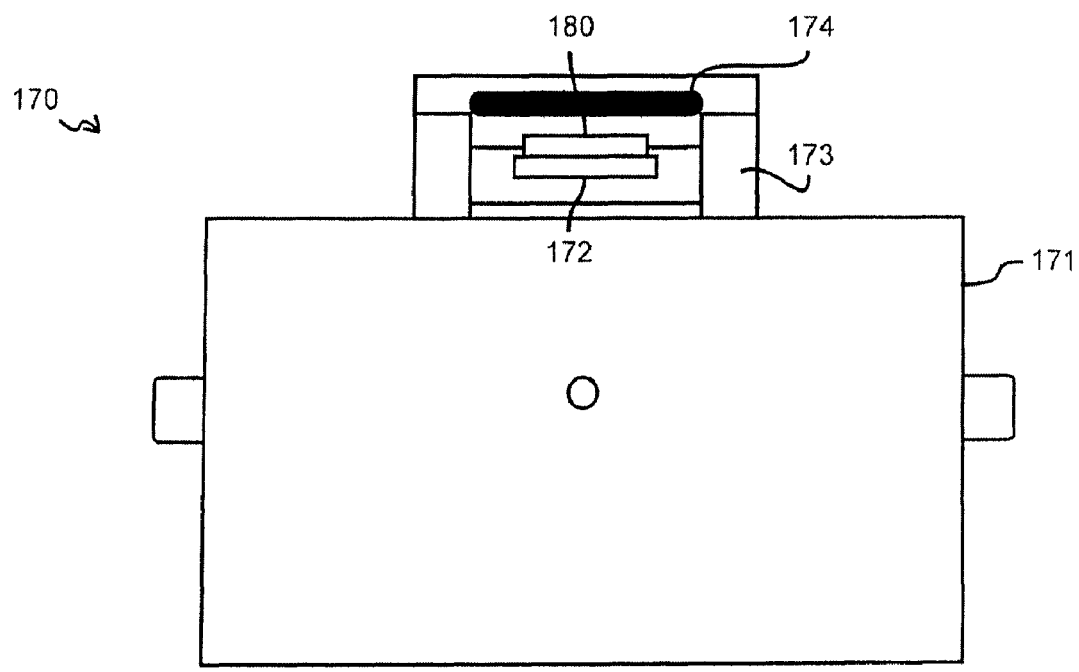

FIG. 1 shows a flowchart of an embodiment according to the invention for a method of energy calibration of a laser device, FIG. 2 shows an energy-ablation depth diagram for various test ablations which have been carried out, FIGS. 3a and 3b show, in schematic block representation, an embodiment according to the invention of a laser device, before and after a test ablation, FIGS. 4a and 4b show a positioning module for fixing a test object in a defined, changeable position, in plan and side view respectively, and FIG. 5 shows a test object which is provided with test ablation positions and a control ablation position, in plan view.

In FIG. 1, a possible embodiment of a method according to the invention is shown, with steps S1-S8. To calibrate the pulse energy of a laser device which provides pulsed laser radiation, first an initial pulse energy is set on the laser device (S1). This initial value of the pulse energy can either be near the desired setpoint energy or on an edge of a range which covers the desired pulse energy.

With this first set pulse energy, a test ablation is carried out on a test object, e.g. with several thousand laser pulses (S2). By the impinging pulse energy of the working laser beam, at the test ablation position a specified quantity of the test object material is removed, so that an indentation forms on the test object.

This ablation depth is determined by means of a pachymeter (S3). Using pachymetry, it is possible to set the distance of the test object from the laser device exactly, and simultaneously to measure the thickness of the test object. A suitable material for the test object, with ablation, should either have an interaction with the working laser beam which is comparable to that between the later target object (e.g. the cornea) and the working laser beam. Or a material of which the reaction to the irradiated laser pulses is different (e.g. of different strength) compared with the material to be treated later (e.g. biological tissue) is used, but the relationship between the reaction of the test material and the reaction of the material to be treated is known at least to a broad approximation, e.g. from empirical data. The material of the test object must also be accessible to pachymetry. In this connection, the material polymethylmethacrylate (PMMA) in the form of thin laminae has been shown to be specially suitable. After the depth of the ablation position is determined, a first ablation depth/pulse energy value pair exists.

Starting from this measured value, the pulse energy for a further test ablation is changed (S4). For this purpose, starting from the first pulse energy, the next pulse energy is raised/reduced by one step width. Alternatively to this step by step scanning of an energy range, other methods are conceivable. For instance, the setpoint energy value could also be determined by an iterative interval nesting method.

The method continues by executing steps S2-S4 again, until either the previously defined pulse energy range is run through or the test object is provided with the maximum number of test ablations.

Next, a relationship between the measured ablation depths and the associated pulse energies is determined (S5). For instance, a linear correlation of the ablation depth and pulse energy can be assumed, and a compensating straight line can be fitted to the pulse energy/ablation depth value pairs ("linear fit"). If appropriate, regression analyses of higher order or fitting according to other models can be carried out.

From the functional relationship which is determined in this way, the required setpoint energy can be calculated from the desired setpoint ablation depth (S6).

The setpoint energy value is set, and a control ablation with the determined setpoint energy is carried out (S7). The ablation depth of the control ablation, which is determined next, should now correspond to the desired setpoint ablation depth, which is verified by comparing the control ablation depth with the setpoint ablation depth (S8).

In this way, the working laser, after the method according to the invention is carried out, is calibrated simply and precisely for its ablation effect, and for instance prepared for carrying out ophthalmological laser surgery.

FIG. 2 shows an example of such a calibration process according to the method according to the invention. In the diagram, the energy of a laser pulse in mJ is shown on the abscissa, and a range of 1.58-1.76 mJ is shown. Test ablations with energy values 1.60 mJ, 1.65 mJ, 1.70 mJ and 1.75 mJ were carried out. The ablation depths which were determined by pachymetry are shown on the ordinate in μm, in a range of 35-75 μm. The ablation depths associated with the pulse energy values are 55 μm, 60 μm, 65 μm and 70 μm. The following compensating straight line can be fitted to these four measured value pairs A-D:

$$y = 100x - 105$$

The parameter y represents the ablation depth in μm, and the parameter x represents the energy of the laser pulse in mJ. For instance, if the setpoint ablation depth is 63.5 μm, which is designated in the diagram by the symbol $E_y$, the result for the suggested setpoint energy is 1.658 mJ. This value is designated in the diagram by the symbol $E_x$.

Of course, use of linear regression is only one of many possibilities for determining the desired setpoint energy for a specified setpoint ablation depth from the measured value pairs.

The laser device 100 shown in FIGS. 3a and 3b is designed, for instance, for ophthalmological laser surgery, and includes, as the laser radiation source, a working laser 110 which is suitable for cornea ablations and emits pulsed radiation, an eye tracker 120, which is used to follow the eye movements during the cornea treatment, and a fixing light 140, on which the patient must fix his or her eyes during the cornea treatment, to keep the eye movements as small as possible. A pachymeter 130, which is suitable for capturing the cornea thickness by means of OLCR (Optical Low Coherence Reflectometry), is also integrated in the laser device 100. All the above-mentioned components 110-140 work on a common optical axis X, which is implemented by various optical components such as mirrors, lenses, etc. In FIGS. 3a and 3b, these optical components are indicated only schematically as mirrors 160. As well as the above-mentioned components, which are known per se, the laser device according to the invention has a positioning module 170 and a computer 150. The positioning module 170 is shown only schematically as a block; there is a more detailed description of it in relation to FIGS. 4a and 4b. On the positioning module, fitted so that it can be replaced, is a so-called fluence test disc 180 of polymethylmethacrylate (PMMA). Both the components 110-140 and the positioning module 170 are connected via control lines 190 to the computer 150. The computer has a control program 200, which is designed to control the components 110-140 and the positioning module 170.

To determine a setpoint pulse energy of the laser device 100, both the distance of the fluence test disc 180 from the laser device 100, in particular from the pachymeter 130, represented by the double arrow 210, and the thickness of the fluence test disc 180, represented by another double arrow 220, are determined. On the basis of these measurement data, the working laser 110 and positioning module 170 are controlled so that multiple test ablations are carried out at different positions of the fluence test disc 180. In FIG. 3b, such a test ablation 230 is indicated schematically. Directly after a test ablation is carried out, the test ablation position 230 is measured by means of the pachymeter 130, so that the resulting ablation depth is determined. This is indicated schematically in FIG. 3b by reference symbol 240. After a series of test ablations is carried out with different pulse energies, as described above in relation to FIGS. 1 and 2, the desired setpoint pulse energy for a target ablation depth can be determined.

In FIGS. 4a and 4b, the positioning module 170, which has already been mentioned in relation to FIGS. 3a and 3b, is shown in more detail. FIG. 4a shows a schematic plan view, whereas FIG. 4b shows a schematic side view, of the positioning module. The positioning module 170 has a housing 171. On its top side, a receiving plate 172 to receive the fluence test disc 180 is provided, the receiving plate 172 being arranged on a receiving device 173, which is joined permanently to the housing 171. An air outlet opening 174 is integrated in the receiving device 173.

The fluence test disc 180 is held by the receiving plate 172. When a series of test ablations is carried out, the test ablation positions 230 are distributed evenly at 90° angles on the fluence test disc 180, by the fluence test disc being rotated by 90° between the individual test ablations, e.g. counterclockwise, e.g. by means of a motor drive which the computer controls. This is indicated in FIG. 4a by the arrow 175. To ensure reproducible measurement results, an air flow is directed onto the top of the fluence test disc, it emerges at the opening 174 and moves over the surface of the fluence test disc 180. The air flow can be used to conduct away any heat. A fan to generate the air flow and a servo motor to drive the receiving plate 172 in rotation can be housed, for instance, in the housing 171 (neither shown). The air flow is usefully directed so that it can remove ablation products in the ablation cloud which appears above the test disc, and thus keep the region above the disc clean and free of disturbing particles.

FIG. 5 shows an enlarged view of a fluence test disc 180. Such a circular fluence test disc can, for instance, consist of polymethylmethacrylate (PMMA), have a radius of 30 mm and be about 4 mm thick. Of course, a fluence test disc can be produced in any shape (e.g. square, strip-shaped, etc.) and with dimensions which differ from those stated above. The test ablation disc 180 has four peripheral ablation positions 230-233, which here are arranged at equal distances from each other and as close as possible to the edge. The purpose of this arrangement is to prevent the disc surfaces which are still being used for ablation being contaminated by ablation products of a preceding test ablation, by ensuring a maximum possible distance of the test ablation positions 230-233 from each other.

At the centre of the fluence test disc, a control test ablation position 234 is arranged. After measurement of the ablation depth of the test ablations at the test ablation positions 230-233 and analysis of the ablation depths, it is ablated with a pulse energy corresponding to the determined setpoint energy. If a suitable movement mechanism is provided, the control ablation position 234 can also be measured with the pachymeter 130. Alternatively, however, a mechanical measurement method such as measurement by means of a depth measurement probe can be used. By using two independent measurement methods, a lower probability of error is achieved.

The invention claimed is:

1. A laser calibrating method, the method comprising:
   performing a plurality of test ablations on one or more test objects using pulsed laser radiation, each test ablation being performed with a different pulse energy of the pulsed laser radiation;
   measuring an ablation depth of each test ablation by means of a coherent optical interferometric measuring device;
   determining a target pulse energy based on the measured ablation depth of each test ablation and a target ablation depth; and
   adjusting the pulse energy of the pulsed laser radiation to the determined target pulse energy.

2. The calibrating method of claim 1, wherein each test ablation is performed using a plurality of pulses of the pulsed laser radiation.

3. The calibrating method of claim 1, where in the measuring device is an optical low-coherence reflectometry measuring device.

4. The calibrating method of claim 1, wherein the ablation depth of each test ablation is measured using measuring radiation which runs along the direction of the pulsed laser radiation.

5. The calibrating method of claim 1, wherein at least one test object is subjected to plural test ablations, the method further comprising:
   moving the test object relative to the measuring device between successive ones of the plural test ablations to thereby apply the plural test ablations at different positions on the test object.

6. The calibrating method of claim 5, wherein the test object is disk-shaped and the plural test ablations are applied at a radial distance from a disc centre of the test object, the method further comprising:
   turning the test object by a specified angle of rotation between successive ones of the plural test ablations.

7. The calibrating method of claim 1, further comprising:
   performing a control ablation with the determined target pulse energy on a test object; and
   measuring an ablation depth of the control ablation by means of the measuring device.

8. The calibrating method of claim 7, wherein the control ablation is applied to a test object to which at least one of the test ablations has been applied.

9. The calibrating method of claim 1, further comprising:
   generating an air flow; and
   directing the air flow towards an ablation-receiving area of a test object.

10. A laser apparatus comprising:
    a laser source providing pulsed laser radiation for processing an object;
    a coherent optical interferometric measuring device for measuring at least one longitudinal extension using measuring radiation which runs along the direction of the pulsed laser radiation;
    a positioning module for controllably positioning at least one test object in a plurality of positions relative to the laser source;
    a control unit cooperating with the laser source, the measuring device and the positioning module to effect operations of:
      performing a plurality of test ablations on the at least one test object using the pulsed laser radiation, each test ablation being performed with a different pulse energy of the pulsed laser radiation;
      controlling the positioning module so as to move the at least one test object in different positions with respect to the laser source between successive ones of the plurality of test ablations;
      measuring an ablation depth of each test ablation by means of the measuring device;
      determining a target pulse energy based on the measured ablation depth of each ablation and a target ablation depth; and
      adjusting the pulse energy of the pulsed laser radiation to the determined target pulse energy, thereby calibrating the laser source.

11. The laser apparatus of claim 10, wherein the positioning module is configured to rotate the at least one test object.

12. The laser apparatus of claim 11, wherein the positioning module is configured to rotate the at least one test object a predetermined amount between test ablations.

13. The laser apparatus of claim 12, wherein the predetermined amount is approximately 90 degrees.

14. The laser apparatus of claim 12, wherein the at least one test object is disk-shaped and the positioning module is configured to rotate the at least one test object such that the plurality of test ablations are applied at positions radially spaced from a center of the test object.

15. The laser apparatus of claim 10, further comprising an air source associated with the positioning module such that the air source is configured to direct air over a surface of the at least one test object.

* * * * *